United States Patent
Takeuchi

[19]

[11] Patent Number: 6,128,315
[45] Date of Patent: Oct. 3, 2000

[54] DISTRIBUTED CONTROL NETWORK SYSTEM

[75] Inventor: Yoichiro Takeuchi, Urawa, Japan

[73] Assignee: Kabushiki Kaisha Toshiba, Kawasaki, Japan

[21] Appl. No.: 08/990,538

[22] Filed: Dec. 15, 1997

[30] Foreign Application Priority Data

Dec. 18, 1996 [JP] Japan .................................. 8-338490

[51] Int. Cl.[7] .............................. H04L 12/28; H04J 3/16
[52] U.S. Cl. ......................... 370/466; 370/400; 370/410
[58] Field of Search .................................. 370/400, 410, 370/466, 467; 395/705; 704/2; 709/201, 203

[56] References Cited

U.S. PATENT DOCUMENTS

| | | | |
|---|---|---|---|
| 5,323,311 | 6/1994 | Fukao et al. ............................. | 704/2 |
| 5,768,564 | 6/1998 | Andrews et al. ......................... | 395/705 |
| 5,987,401 | 11/1999 | Trudeau ..................................... | 704/2 |

*Primary Examiner*—Chi H. Pham
*Assistant Examiner*—Brenda H. Pham
*Attorney, Agent, or Firm*—Finnegan, Henderson, Farabow, Garrett & Dunner, L.L.P.

[57] ABSTRACT

In the distributed control network system, the local control server has a just-in-time compiler with which the user transforms the control for each node described in Java into a code that can be executed on the node at the time of execution. Additionally, the local control server has a functional feature of transforming the protocol so as to make the nodes in its network able to communicate with the nodes in another network having a different protocol. There is also provided means for programming the control to be performed by each node and the flow of processing operations among the nodes in a GUI environment.

8 Claims, 8 Drawing Sheets

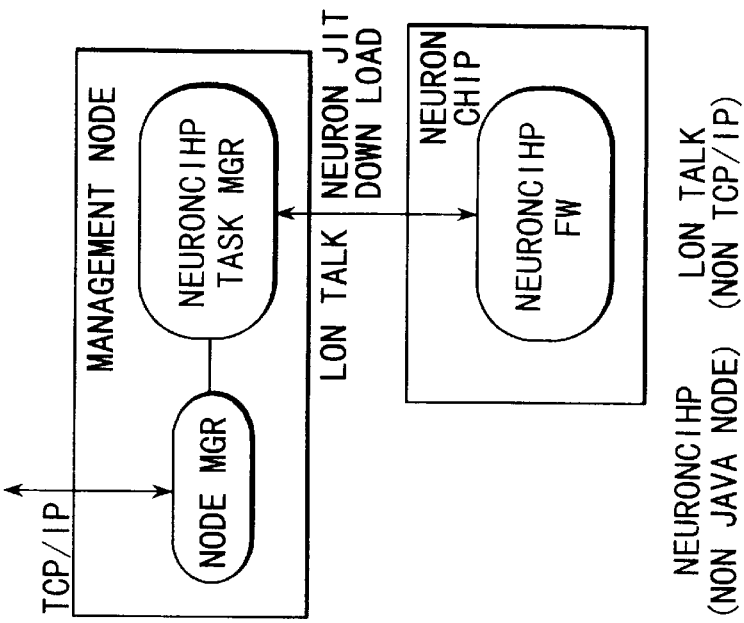
FIG. 5C
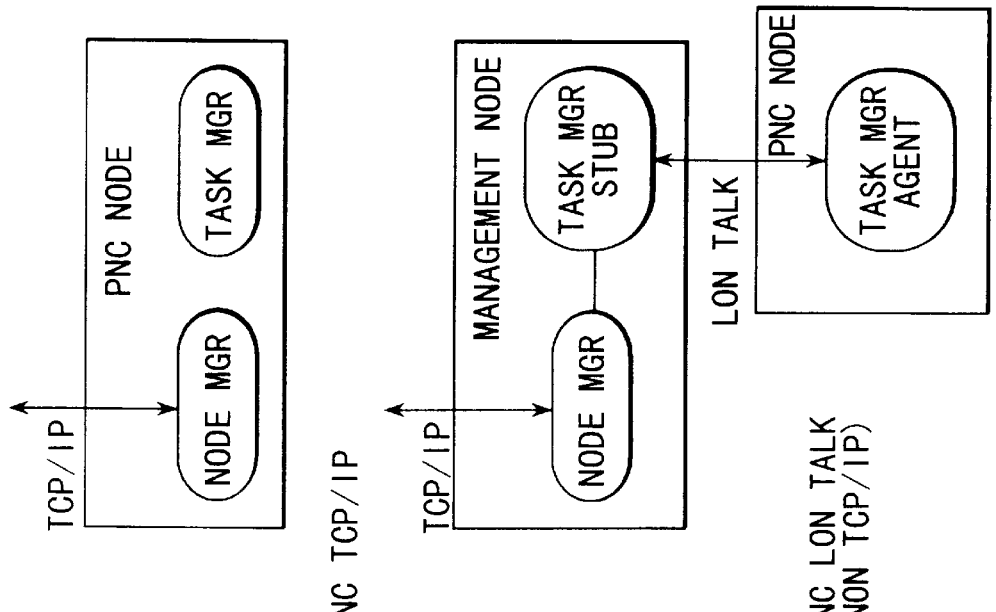
FIG. 5A
FIG. 5B (a)
```
network input  SNVT_lev_disc  nv_switch ;
network output SNVT_lev_disc  nv_lamp ;
when ( nv_updata_occur( nv_switch ) ) {
    if ( nv_switch == ST_ON )
        nv_lamp = ST_ON ;
    else
        nv_lamp = ST_OFF ;
}
```

(b)
```
class TaskLamp extends LonTask
                    impliment LonSchedule {
    private SNVT_lev_disc  switch ;
    private SNVT_lev_disc  lamp ;
    public boolean when () {
        return (switch.nv_pdate_occur() ) ;
    }
    public void task ()  {
        if ( switch.state() == ST_ON )
            lamp.set ( ST_ON ) ;
        else
            lamp.set ( ST_OFF ) ;
    }
    TaskLamp(SNVT_lev_disc nv_switch,
             SNVT_lev_disc nv_lamp ) {
        switch = nv_switch ;
        lamp   = nv_lamp ;
    }
}
```

(c)
```
public class main {
    public static void main(String args[]){
        SNVT_lev_disc  nv_switch
            = new SNVT_lev_disc(input, "Switch") ;
        SNVT_lev_disc  nv_lamp
            = new SNVT_lev_disc( output, "Lamp" ) ;
        TaskLamp  lamp1
            = new TaskLamp(nv_switch, nv_lamp ) ;
        LonTaskManager.install(lamp1) ;
        while (!LonTaskManager.abort())
            LonTaskManager.schedule() ;
    }
}
```

FIG. 7

```
import java.awt.*;
public class Lon{
  public static void main( String [] args){
    // network variables global definition
    NetVarInt nv_switch1 = new NetVarInt("Switch1");
    NetVarInt nv_switch2 = new NetVarInt("Switch2");

// Lon node 1 -- remote switch1 module
    LonTaskManager node1 = new LonTaskManager("Node1");
    NetVarRefInt nv_sw1_out = new NetVarRefInt(node1,"output",nv_switch1);
    IORef io_sw1 = new IORef(node1,"input",2);
    TaskSwitch switch1_task = new TaskSwitch("Switch1",node1,nv_sw1_out, io_sw1);

// Lon node 2 -- remote switch2 module output (switch1 EXOR switch2)
    LonTaskManager node2 = new LonTaskManager("Node2");
    NetVarRefInt nv_sw1_in = new NetVarRefInt(node2,"input",nv_switch1);
    NetVarRefInt nv_sw2_out = new NetVarRefInt(node2,"output",nv_switch2);
    IORef io_sw2 = new IORef(node2,"input",4).
    TaskExor switch2_task = new TaskExor("Switch2",node2,nv_sw1_in,nv_sw2_out,io_sw2)

// Lon node 3 -- remote lamp module
    LonTaskManager node3 = new LonTaskManager("Node3");
    NetVarRefInt nv_sw2_in = new NetVarRefInt(node3,"input",nv_switch2);
    IORef io_lamp = new IORef(node3,"output",3).
    TaskLamp lamp_task = new TaskLamp("Lamp",node3,nv_sw2_in,io_lamp);

// Task start
    node1.start();   node2.start();   node3.start();
  }
}
```

FIG. 9

```
class TaskSwitch extends LonTask {
 private NetVarRefInt SwitchOut;
 private IORef io_switch;

public boolean when(){
   return ( io_changes(io_switch));
 }
 public void task(){
   if( io_in(io_switch) == ST_ON )
     SwitchOut.set( ST_ON );
   else
     SwitchOut.set( ST_OFF );
 }
 TaskSwitch(String myname,LonTaskManager node,NetVarRefInt nv_sw,IORef io_sw ){
   super(myname, node);
   SwitchOut = nv_sw ; io_switch = io_sw ;
 }
} class TaskExor extends LonTask{
 private NetVarRefInt SwitchIn;
 private NetVarRefInt SwitchOut;private IORef io_switch;

public boolean when(){
   return ( io_changes(io_switch) || nv_update_occur(SwitchIn));
 }
 public void task(){
   if( (io_in(io_switch)^SwitchIn.state()) == ST_ON )
     SwitchOut.set( ST_ON );
   else    SwitchOut.set( ST_OFF );
 }
 TaskExor(String myname,LonTaskManager node,
         NetVarRefInt nv_sw_in, NetVarRefInt nv_sw_out, IORef io_sw ){
   super(myname, node) ;
   SwitchIn = nv_sw_in ; SwitchOut = nv_sw_out ; io_switch = io_sw ;
 }
} class TaskLamp extends LonTask {
 private NetVarRefInt SwitchIn;
 private IORef LampOut;

public boolean when(){
   return ( nv_update_occur(SwitchIn) );
 }
 public void task(){
   io_out(LampOut,SwitchIn.state());
 }
 TaskLamp( String myname, LonTaskManager node,
           NetVarRefInt nv_sw, IORef io_lamp){
   super(myname, node);
   SwitchIn = nv_sw; LampOut = io_lamp ;
 }
}
```

FIG. 10

DISTRIBUTED CONTROL NETWORK SYSTEM

BACKGROUND OF THE INVENTION

The entire contents of Japanese Patent Application No. 8-338490 filed on Dec. 12, 1996 are incorporated herein by reference.

This invention relates to a distributed control network system involving the use of an object-oriented language designed for Internet such as Java.

A known distributed control network system as illustrated in FIG. 1 of the accompanying drawings typically comprises individual control networks (local control networks 9, 15) connected thereto by way of local control servers 7, 13 in addition to a control client 3 and a global control server 5 connected by way of a TCP/IP, which is an Internet protocol. Then, individual control nodes 11, 17 comprising non-proprietary distributed control chips are connected to the local control networks 9, 15.

To date, while controls can be interchanged among the control nodes within a local control network of a distributed control network system, no interchange of controls is possible among control nodes connected to different local control networks. For example, the control node 11 connected to the local control network 9 cannot control the control node 17 connected to the local control network 15 (and the control node 17 requires a specific program adapted to its environment for program execution).

Thus, the processing operations of each control node have to be described and compiled to produce object codes in order to prepare an execution file by combining the object codes by means of linkers.

Known distributed object communication techniques include RPC (Remote Procedure Call). The RPC is a basic technique for realizing distributed processings designed to call a procedure (program) for operating on a different computer connected to the network. "Java", an object-oriented language for Internet, comprises RMI (Remote Method Invocation) as a distributed object communication feature. However, all of these techniques are designed for synchronous calls and the client calling the server is held in a stand-by state from the time it calls the server to the time the latter responds so that the client can proceed only after the server responds. Such an arrangement is not adapted to control networks because they are typically designed in such a way that a program operates in response to an event to generate another event and another program operates in response to the latter event and so on.

Meanwhile, "socket" is known as a typical inter-program communication technique of UNIX. However, with the "socket", the data format to be used for exchanging programs between a program asking for a processing operation and a program asked for carrying out the processing operation has to be rigorously defined in the first place and then the programs have to be written according to the defined format. Therefore, the programmer cannot write a program to be asked for carrying out a processing operation without thoroughly understanding the processing procedure of the program. Additionally, the "socket" is basically a 1 to 1 inter-program communication technique.

As described above, to date, control nodes connected to different control networks of a distributed control network system cannot communicate with each other.

Additionally, known inter-program communication techniques including RPC and RMI are not adapted to control networks because they are designed for synchronous calls. Still additionally, the "socket" does not have a standardized data format and is basically a 1 to 1 inter-program communication technique and hence it is not adapted to control networks.

Finally, while various program developing tools using object-oriented languages are known, they are not adapted to the GUI (Graphical User Interface) environment and hence accompanied by difficulties for preparing programs. For instance, when a user uses various tools, he or she must input individual tool's name one by one, resulting in cumbersome. Thus, there has been a strong demand for a powerful tool that facilitates the operation of developing programs.

BRIEF SUMMARY OF THE INVENTION

An object of the present invention is to provide a distributed control network system that can coordinately control the control nodes connected to different local control networks to allow them communicate with each other.

Another object of the present invention is to provide a distributed control network system capable of providing a standardized data format and a 1 to multiple inter-program communication scheme.

Still another object of the present invention is to provide a distributed control network system that facilitates the operation of developing programs.

According to the invention, the above objects and other objects of the invention are achieved by providing a distributed control network system characterized by comprising a control client connected to a first communication network by means of a first communication protocol; a plurality of event-driven type distributed control microcomputers connected to a second communication network by means of a second communication protocol for executing programs written in a language different from the program language used by the control client; and a local control server connected to the first communication network by means of the first communication protocol for controlling the distributed control microcomputers by means of the second communication protocol via the second communication network, the event-driven type executing programs written in the language same as the one used by the control client, transforming the processing program downloaded from the control client into a program written in the program language used by the distributed control microcomputers if the downloaded processing program being a program to be processed by the distributed control microcomputers and transmitting the transformed processing program to the distributed control microcomputers.

With a distributed control network system according to the invention, Java is the language used by the local control server, which possesses means for just-in-time compiling adapted to the environment for program execution if the downloaded processing program has to be executed by the distributed control microcomputers.

Preferably, a distributed control network system as defined above is characterized in that it further comprises a third communication network connected to the first communication network and having a control server and a plurality of distributed control microcomputers connected thereto by way of a communication protocol different from the communication protocols for the first and second communication networks and the control server of the second communication network has means for transforming the communication protocol of the second communication network into the communication protocol of the third communication network and vice versa in order to make the distributed control microcomputers connected to the second communication protocol and the distributed control microcomputers connected to the third communication protocol capable of communicating with each other.

Preferably, a distributed control network system as defined above is characterized in that the first communication network is a global network defined by the communication protocol of TCP/IP and the second communication network is a local network.

According to the invention, there is also provided a distributed control network system, characterized by comprising a plurality of control nodes comprising so many event-driven type distributed control microcomputers connected to a second communication network by means of a second communication protocol for executing tasks assigned respectively to them and written in a language different from the program language used by the control client; and a control server for enforcing a set of relationships among the plurality of distributed control microcomputers defined in a language same as the language used by the control client for the correspondence between a troubled one of the distributed control microcomputers and the one designed to replace the troubled microcomputer and execute its task and, upon the occurrence of a trouble in one of the plurality of distributed control microcomputers, causing the task assigned to the troubled microcomputer to be executed without interruption by a replacing distributed control microcomputer by automatically selecting the replacing microcomputer.

Preferably, a distributed control network system as defined above is characterized in that the control client is shielded from the occurrence of a trouble in the distributed control microcomputers.

According to the invention, there is also provided a program developing apparatus for a distributed control network system having a plurality of control nodes and a control server for controlling the control nodes, characterized by comprising a parts window for displaying a group of icons representing objects of control on a graphic display screen; a program editing window; means for moving the icons displayed on the parts window into the program editing window by means of drag and drop operation to visually and positionally combine the objects of control with respective nodes and defining the flow of processing operations by connecting the plurality of nodes by means of lines; and means for generating source programs for the distributed control network system according to the positions of the objects of control combined with the respective nodes and the flow of processing operations defined by the preceding means.

According to the invention, a local control server for connecting Internet and a local control network and operating as a router is made to take the role of transforming TCP/IP that is an Internet protocol and the dedicated protocol of the local control network.

Additionally, according to the invention, the control operation of the local control server can be described in "Java" which is an object-oriented language of Internet so that the local control server possesses a compiler for a local control node that does not have the environment for executing "Java", carries out program compiling operations on a just-in-time basis by adapting itself to the environment for program execution and transmits the compiled program to the node controller.

Still additionally, according to the invention, a standardized data format can be used for inter-program communication by adopting network variables and broadcast or multicast communication is made feasible so that control networks can be made compatible with Internet without problem.

Finally, according to the invention, application programs can be developed with ease in a visual GUI environment because source codes can be generated simply by dragging and dropping buttons representing program parts on a system design canvas.

As described above in detail, the present invention provides the following advantage.

(1) It makes the nodes connected to different local networks capable of communicating with each other by absorbing the differences in the architecture among the individual networks by means of a local control server. (2) It facilitates programming operations by applying the network variables used in the communication among individual nodes to the local control server and makes it possible for broadcast or multicast programs to communicate with each other. (3) It simplifies the programming operation, improves the debugging efficiency and facilitates the development of programs by allowing the operation of designing network systems under a visual GUI environment. (4) Since Java employs dynamic links and a class file that constitutes the link unit basically stores a class and its method, it is possible to configure flexible systems. Additionally, only JavaVM requires transplantation for a Java program to operate on a new platform so that, once transplanted, any Java program does not require any reworking for transplantation. Additionally, the effort required for transplanting a virtual machine is by far smaller than the effort required for using a traditional programming language (for modifying the portions relying on the individual programs and libraries and recompiling them). Thus, since Java assumes an environment where codes downloaded from Internet are executed and has an error check function of checking a program from running away, the present invention allows a distributed control network system to operate safely and reliably.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C are schematic illustration of a mode of operation of the process control network of FIG. 2;

FIG. 7 is a source code list describing the controls for the individual nodes of FIG. 6;

FIG. 9 is a part of the program list showing the coding operation that appears in the definition of the task of each node and the flow of processing operations among the nodes for a programming operation shown in FIG. 8; and FIG. 10 is the rest of the program showing the coding operation that appears in the definition of the task of each node and the flow of processing operations among the nodes for a programming operation shown in FIG. 8.

DETAILED DESCRIPTION OF THE INVENTION

Now, the present invention will be described by referring to the accompanying drawings that illustrate preferred embodiments of the invention.

Figure 2:
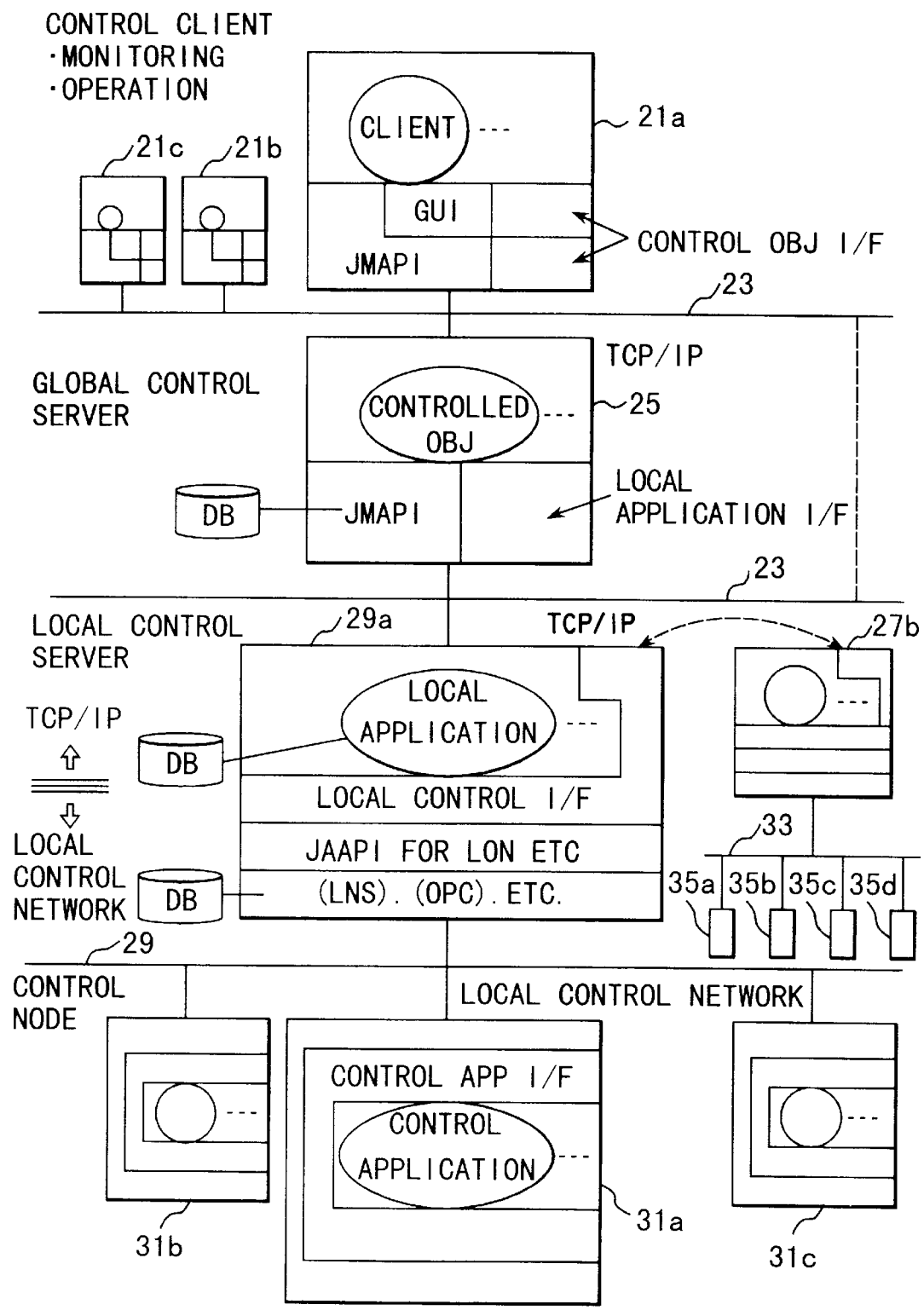
FIG. 2 is a block diagram of a first embodiment of distributed control network system.

FIG. 2 is a block diagram of a first embodiment of distributed control network system according to the invention.

Figure 3:
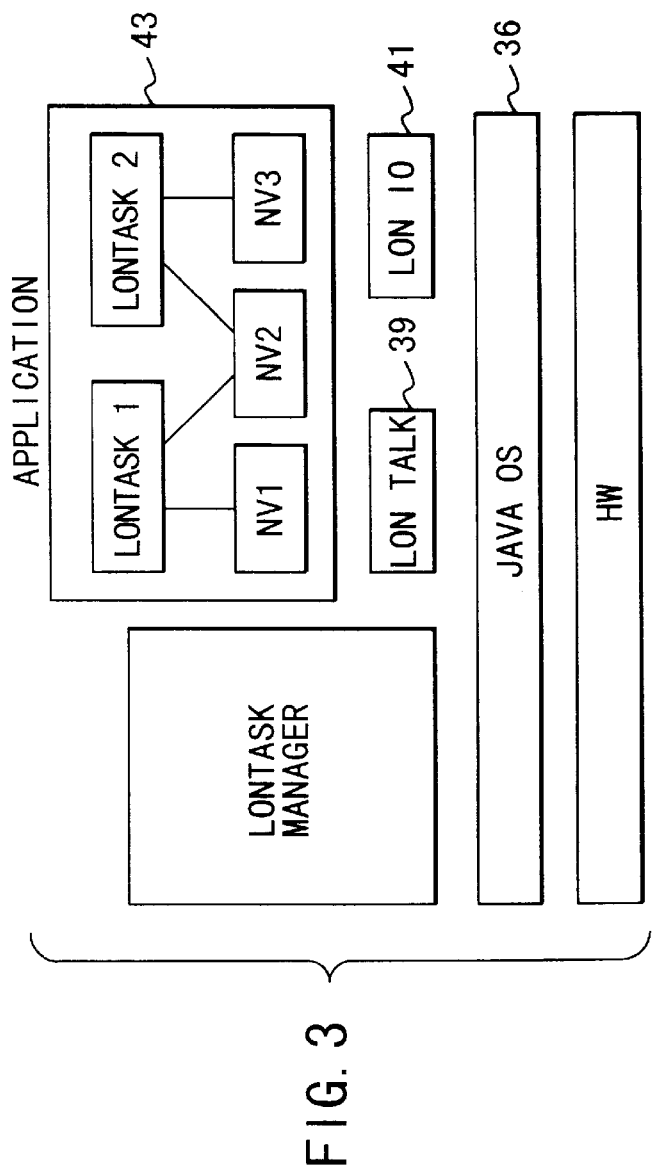
FIG. 3 is a schematic illustration of the process network computer architecture in the local control server shown in FIG. 2.

Referring to FIG. 3, a plurality of control clients 21a, 21b, 21c mare connected typically by way of the TCP/IP protocol of Internet. In addition, a global control server 25 is connected to the control clients 21a, 21b, 21c by way of a TCP/IP in order to execute processing operations requested by the control clients 21a, 21b, 21c. Still additionally, the global control server 25 is connected to a plurality of local control servers 27a, 27b also by way of a TCP/IP. The local control server 27a is connected to a plurality of control nodes 31a, 31b, 31c by way of a local control network 29. Similarly, the local control server 27b is connected to a plurality of control nodes 35a, 35b, 35c by way of a local control network 33.

The control node 31a is a distributed control microcomputer, which may be a NEURON chip available from Echelon in the U.S.A. (a neuron chip TMPN3150 available from Toshiba Corporation, Japan). The tasks of the distributed control microcomputer are scheduled on an even-driven basis. In other words, when a specific condition becomes TRUE, the code (task) linked to the condition is executed. Events that can be defined as those for triggering specific tasks may include a change in the state of an input pin, the reception of a new value for a network variable and a timer time out status. The communication between control nodes is conducted by means of a local communication protocol such as LONTALK available from Echelon in the U.S.A. The LONTALK protocol is described in detail in Toshiba Neuron Chip TMPN3150/3120 Data Book.

The control operations to be performed by the control node are described in a language dedicated to the control node, which may be the Neuron Language available for Echelon.

The local control server 27a possesses a local network system (LNS) for controlling the control nodes 31a, 31b, 31c. The network constituted by the control nodes 31a, 31b, 31c and the local control server 27a will be referred to as local operating network (LON) hereinafter.

FIG. 3 is a schematic illustration of the architecture of the local control server 27a. As shown in FIG. 3, in a distributed control network system according to the invention, the local control server 27a is controlled by a Java OS (Operating System). Application 43 refers to a functional feature to be executed by the individual distributed controls 31a, 31b, 31c that is described by the user in Java, which is an object-oriented language designed for Internet. Java has advantages including that it can clearly discriminate software and hardware and prepare programs that operate without requiring recompilation if the microcomputer and/or the OS are modified and that it can develop programs that are relatively free from bugs. Therefore, it can provide a high productivity and an enhanced reliability (or a reduced probability of finding bugs inherent in the program) and develop pieces of software independent from the processor architecture. The task manager "LonTask Manager" 37 has compilers adapted respectively to the execution environments of the individual nodes so that it compiles the application program written in Java by the user on a just-in-time basis, generates object codes adapted respectively to the execution environments of the individual nodes and transmits them to the control nodes by means of the "Lon Talk" 39 that is the communication protocol of LON and the "Lon IO" 41 for controlling input/output operations of LON. The just-in-time compiler system is a system adapted to converting the byte code downloaded from the global control server 25 into a code good for the OS in the executing environment and the microcomputer before executing them. More specifically, from the viewpoint of this embodiment, the local control server 27a has a functional feature of converting the downloaded byte code into the Neuron C Language that is the execution language of the control node. With this arrangement, the user can operate for programming with ease. Conventionally, the function to be performed at the control node is written typically in the Neuron C Language and the function to be performed at the local control server is written in the object-oriented language C++. Then, the tasks of individual nodes are written as object codes, which are stored in the data base so that the task manager may read any of them out of the data base whenever necessary and distribute it to the corresponding node for execution. With such an arrangement, then, if the control chip of a node is replaced by another chip, all the programs will have to be rewritten. Contrary to this, according to the invention, the user does not have to be aware of control nodes because he or she is required to write programs in the Java Language only for the local control server. Therefore, if the control chip of a node is replaced by another chip, the programs do not require any rewriting.

Additionally, a control node in a network system according to the invention has an object of network variable (NV) for facilitating a plurality of nodes to share data. A network variable is an object connected to the network variables on the nodes other than the node of itself. From the network viewpoint, the network variables define the input/outputs of the respective nodes and allows the nodes to share data for distributed applications. When an program writes a value in the output network variable, it is then conveyed to all the nodes having an input network variable and connected to the output network variable by way of the network. For conveying a network variable, a LONTALK message is used and the message will be automatically transmitted. In other words, no explicit operation of the application program is required. The nodes can be defined individually in terms of network variables and network variables can easily connect and reconnect a new LONTALK application to nodes.

However, conventionally, while the value of an output network variable is broadcast to the nodes of the same network, it cannot be broadcast to the nodes connected to any other networks. According to the invention, a local control server is equipped with a functional feature of transforming protocols for different networks so that the value of an output network variable can be broadcast from a node connected to a network to the nodes connected to other networks.

Thus, according to a second characteristic feature of the present invention, a distributed network system can be configured simply by generating codes for defining the positional relationships among the program portions operated on the local control servers and the program portions to be executed by the respective nodes because operations to be conducted on the local control servers and those for exchanging data among the distributed nodes are completely isolated from each other.

With such an arrangement, for example, it may be so defined on the local control server 27a that if the control node 31a is troubled, the control node 31b replaces the control node 31a and performs the task of the control node 31a. Then, the task of a troubled control node will be automatically carried out by a replacement control node that operates normally.

Figure 1:
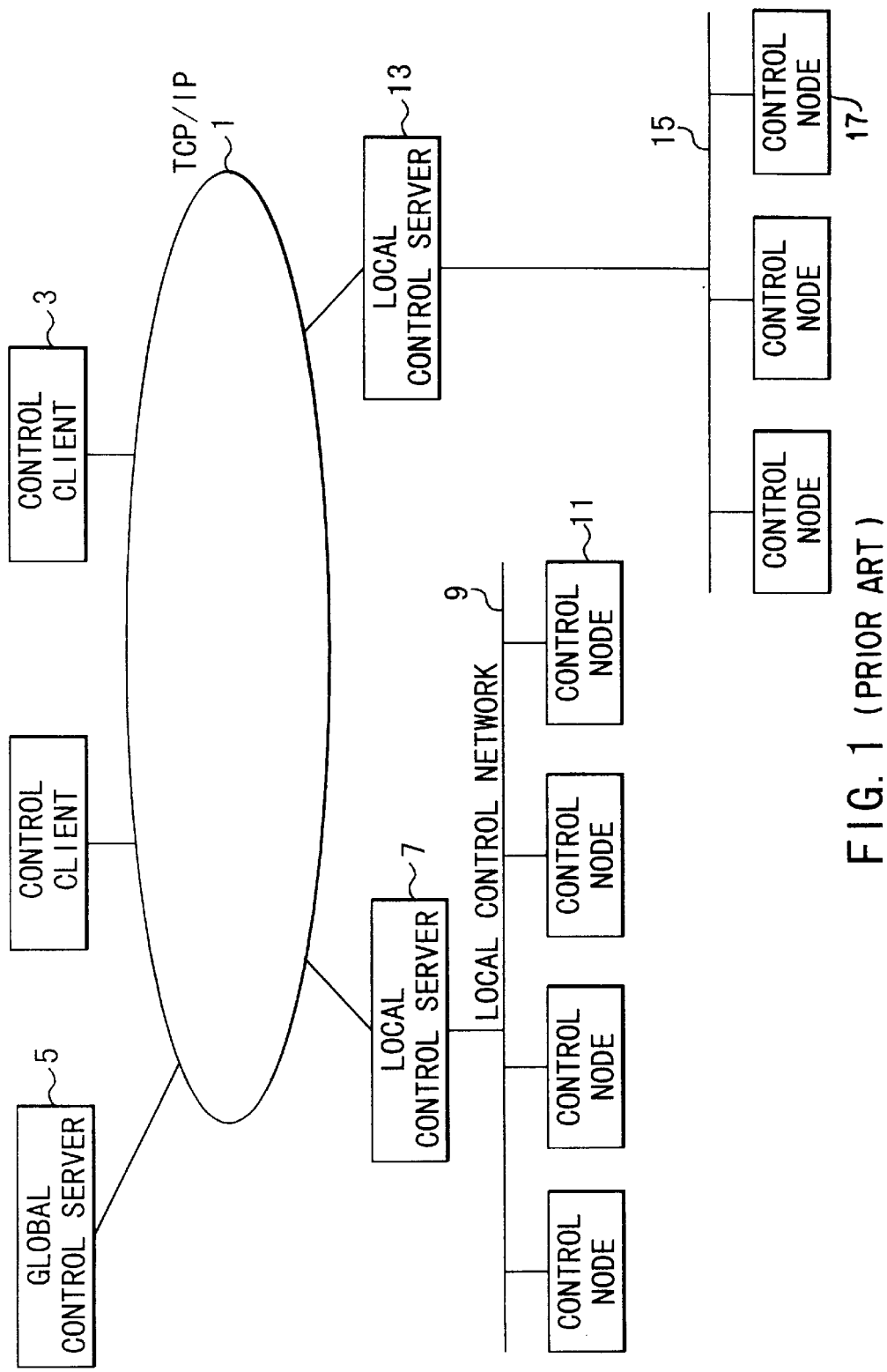
FIG. 1 is a schematic block diagram of a typical known distributed control network system.
Figure 4:
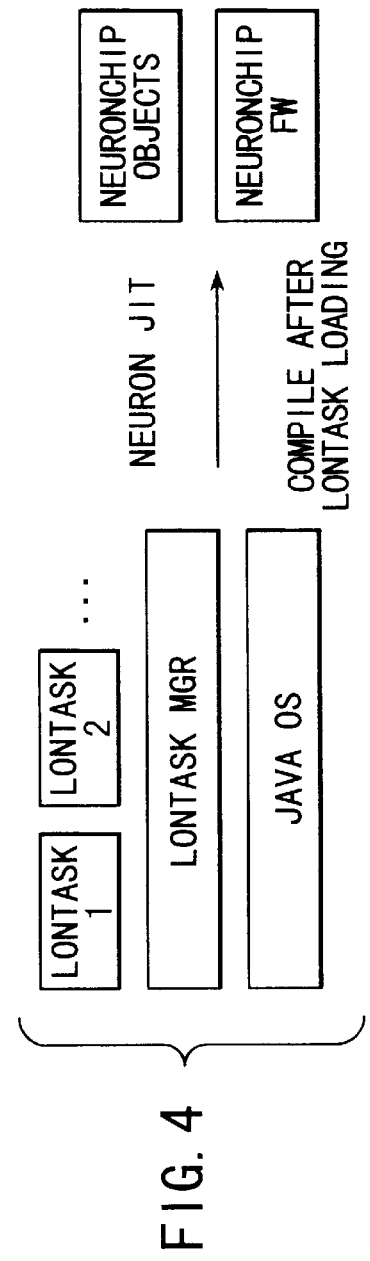
FIG. 4 is a schematic illustration of the operation of just-in-time compilation performed by the local control server of FIG. 1 for the program class assigned to the individual control nodes.

FIG. 4 schematically illustrates the local control server of FIG. 1 having a just-in-time compiler designed for a Neuron chip. As seen from FIG. 4, after loading LonTasks, the instance byte codes (not the class byte code) are complied on a just-in-time basis by means of the just-in-time compiler of Neuron to generate objects for the Neuron chip. If the LonTasks do not require dynamic allocation nor dynamic loading during the execution time, object codes can be generated for the Neuron chip without requiring any specific run time.

FIGS. 5A to 5C schematically illustrate embodiments of process control network (PNC) according to the invention. In the embodiment shown in FIG. 5A, the task manager of the PNC node connected to clients by means of the communication protocol of TCP/IP executes the procedure call from a client. The PNC node in FIG. 5A may typically be written in Java. The embodiment of FIG. 5B comprises a management node and a PNC node, of which the management node is connected to clients by way of a TCP/IP and to the PNC node by way of a non-TCP/IP (e.g., LonTalk). Both the management node and the PNC node are written in Java. Upon receiving a procedure call from a client, the management node sends a task manager agent to the PNC node by means of a task manager tab and have the PNC node to actually execute a task. From the client viewpoint, however, the task appears to be executed by the management node itself. In the embodiment of FIG. 5C, the management node is connected to clients by way of a TCP/IP and also to a dedicated distributed control chip (e.g., Neuron Chip) by way of a non-TCP/IP (e.g., LonTalk). For example, the management node is described in Java, whereas the Neuron chip is described in a dedicated language (Neuron C). The management node comprises a Neuron task manager to compile the task downloaded from a client into an object code for the Neuron chip on a just-in-time basis and download it to the Neuron chip. Then, the Neuronchip executes the object code downloaded from the Neuron chip firmware. In this case again, the management node appears to be executing the object code by itself from the client viewpoint.

As described above, the first embodiment of the invention maps the LON world into the Java world. In other words, a programming model in LON is extended into Java. Thus, a task written in Neuron C is defined as a task class of Java and the scheduler of the Neuron chip is defined as a mask manager of Java, while a network variable is defined as a NV class of Java.

An exemplary programming model is shown below.

| | Programming Model | |
|---|---|---|
| LON World | | Java World |
| when (<EVENT>) { <br> <TASK> <br> } | → | class Xtask extends LonTask { <br>   public boolean when ( ) { <br>     <EVENT> <br>   } <br>   public void task ( ) { <br>     <TASK> <br>   } <br> } |
| Network input into X; | → | NVRefInt X = <br>   new NVRefInt ("input"); |
| 10_7 input bit Y; | → | 10Ref Y = <br>   new 10Ref("input", 7, "bit"); |

Figure 6:
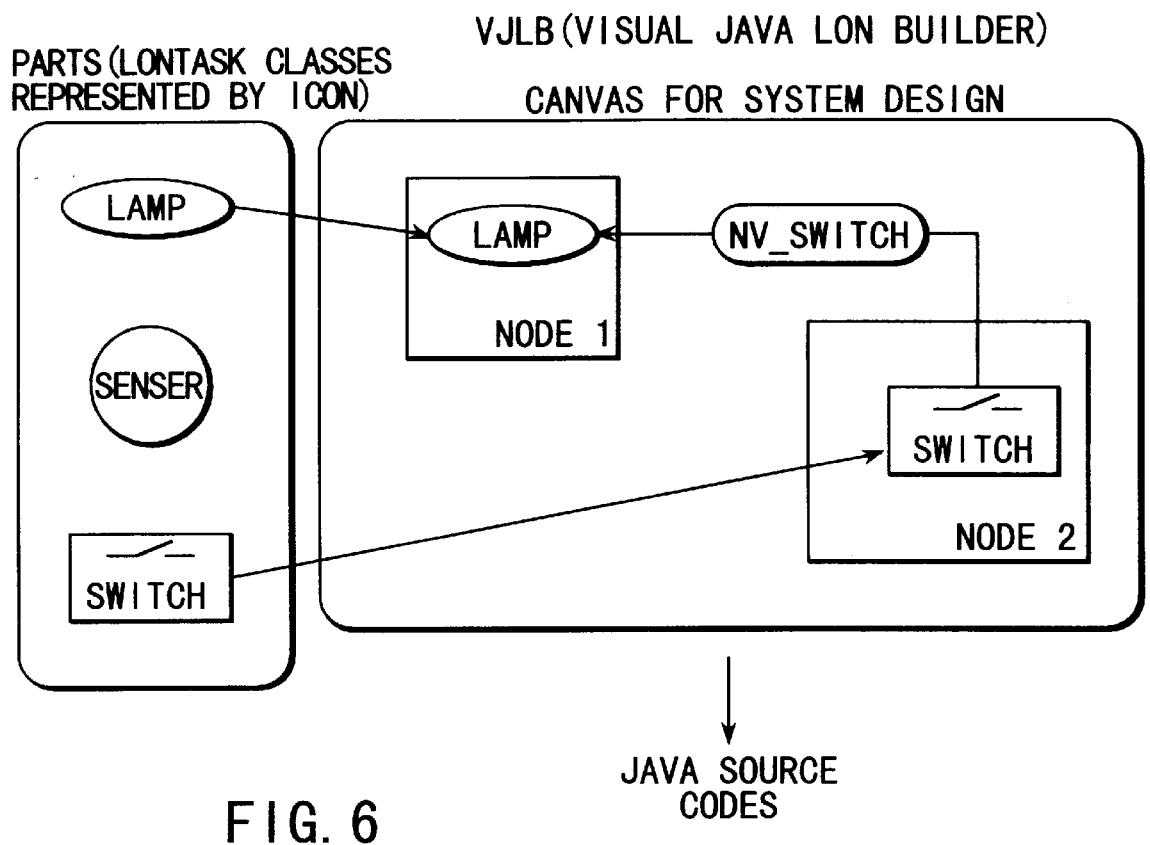
FIG. 6 is a schematic illustration of a tool (Visual Java Lon Builder) for visually developing a program by means of a GUI (Graphical User Interface), which is a second embodiment of the invention.

FIG. 6 is a schematic illustration of a tool (Visual Java Lon Builder) for visually developing a program by means of a GUI (Graphical User Interface), which can easily develop a distributed control network system extending to a plurality of nodes.

Assuming that a control effect of turning on the lamp when the switch is on and turning off the lamp when the switch is off is to be obtained by means of the tool of FIG. 6. If node 1 takes the role of controlling the lamp, whereas node 2 controls the switch, the controls of the nodes will be described in Neuron C as shown in FIG. 7(a). FIG. 7(b) shows the controls of FIG. 7(a) written in Java. In other words, the user describes the control of the switch and that of the lamp in Java in advance. Of course, the user does not have to actually write the description of FIG. 7(b) if it is provided as a standardized task in advance. Then, at the time of execution, the user carries out a series of drag and drop operations on the parts represented by the respective icons on the graphic display screen to determine the locational arrangement of the nodes. As a result, a main program defining the locational arrangement of the nodes as shown in FIG. 7(c) will be automatically generated.

Figure 8:
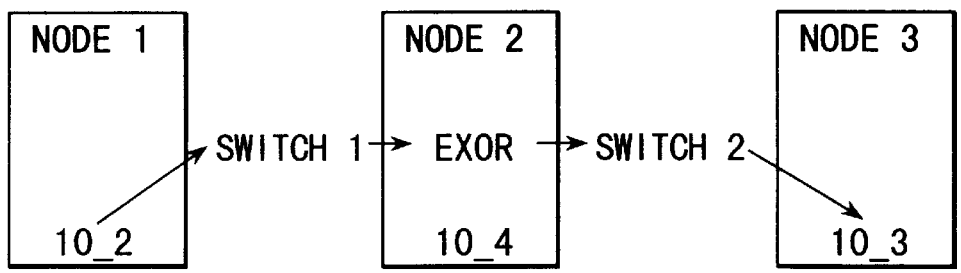
FIG. 8 is a schematic visual illustration showing the definition of the task of each node and the flow of processing operations among the nodes for a programming operation performed in a distributed control network system according to the invention.

Now, an exemplary program will be described by referring to FIGS. 8 through 10. Assume here that there are three nodes, each of which has a task assigned to it as shown in FIG. 8. The first node reads the status of the switch from IO pin 2 and outputs the outcome to network variable "Switch". The second node determines the exclusive OR of the outcome of its operation of reading IO pin 4 and network variable "Switch" and outputs it to network variable "Switch2". Then, the third node outputs the status of the network variable "Switch2" to IO pin 3.

The programmer can directly see the above program (programmed by the user). The rest is, however, shielded by the class definition and the programmer does not have to pay attention to it.

import java.awt.*;

This is the a program that carries out the following processing operations to control the tasks on the nodes.

1. It generates an object of the LonTaskManager class and retrieves the node objects by referring to the node names for in order to interrelate them.

2. It generates an object of the network variable (NetVarInt) class that serves as mediator for exchanging data among the nodes.

3. It interfaces a task and the object of the network variable on the nodes. It also generates an object of the network variable reference (NetVarRefInt) class and interrelates it with the network variable and the nodes.

4. It generates an object of the IO reference (IORef) class for interfacing a task on a node and an IO object and interrelates it with the nodes. (The IO object itself is shielded by the node objects and can be interrelated with them by specifying a IO pin number.)

5. It generates a task and interrelates it with the objects of the nodes, the network variable reference and the IO reference.

Now, the preparation for executing the program is over.

6. It issues a command for executing a task to each of the nodes.

With the above modification of the program, the interrelationship among the nodes, the network variable, the IO and their tasks can be modified without changing the program in each of the tasks.

```
Public class Lon
    public static void main (String [ ] args) {
//network variables global definition
//generating network variables objects
    NetVarInt nv _switch1 = new NetVarInt ("Switch1");
    NetVarInt nv _switch2 = new NetVarInt ("Switch2");
//Lon node 1 -- remote switch1 module
LonTaskManager node1 = new LonTaskManager ("Node1");
//generating a task manager object
//retrieval of a node object named as "Node1"
//interrelating it with the generated objects
        NetVarRefInt nv sw1_out = new NetVarRefInt (node1,
"output", nv_switch1);
//generating a network variable reference object for
//outputting a value to network variable "Switch1" and
interrelating it with "Node1"
        IORef io sw1 = new IORef (node1, "input", 2);
//generating an IO reference object for inputting data
from IO pin2 and
//interrelating it with "Node1"
        TaskSwitch switch1 _task = new TaskSwitch
("Switch1", node, nv_sw1_out, io_sw1);
//generating a task of the TaskSwitch class and
interrelating it with the nodes, the network variables
and IO
        //Lon node 2 -- remote switch2 module output
(switch1 EXOR switch2)
    LonTaskManager node2 = new LonTaskManager ("Node2");
    NetVarRefInt nv _sw1_in = new NetVarRefInt (node2,
"input", nv _switch1);
    NetVarRefInt nv _sw2_out = new NetVarRefInt (node2,
"output", nv _switch2);
    IORef io_sw2 = new IORef (node2, "input", 4);
    TaskExor switch2_task = new TaskExor ("Switch2",
node2,
    nv_sw1_in, nv_sw2_out, io _sw2);
//Lon node3 -- remote lamp module
    LonTaskmanager node3 = new LonTaskManager ("Node3");
    NetVarRefInt nv _sw2_in = new NetVarRefInt (node3,
"input", nv _switch2);
    IORef io_lamp = new IORef (node3, "output", 3);
    TaskLamp lamp _task = new TaskLamp ("Lamp", node3, nv
_sw2_in, io_lamp);
//Task start
    node1, start ( );
    node2, start ( );
    node3, start ( );
//each of the nodes being interrelated to start the
tasks.
        //If the attribute for specifying the computer for
executing //the tasks out of the attributes of the
nodes differs from //computer where the main program is
executed, each of the //objects (task manager, task,
network variable reference, //IO reference) is
transferred to the computer specified by
```

-continued

```
//the attribute and triggered to operate by RMI.
        //If the attributes of the nodes requires
a compiler for //executing the tasks, the corresponding
JIT (Just-In-Time
//compiler) is started to operate and the tasks
are //transformed into negative objects and then
downloaded to //start execution.
        }
}
/*task 1
    The data of the IO object (on the status of each
of the switches, ST_ON or ST_OFF) is read from it and
the value is written on the network variable. The IO
object and the network variable objects to be processed
are forwarded in the form of parameters at the time of
task generation (instance generation).
*/
Class TaskSwitch extends LonTask {
    private NetVarRefInt Switchout;
    private IORef io switch;
        //object local variable slot for accessing
        //network variable reference object and IO
reference objects
public boolean when ( ) {
    return (io_changes (io _switch));
}
//when method. The task manager periodically calls
this //method and, if the called value is true,
executes the task method as follows.
        //IO_changes is returned true when the status of
IO object changes.
        //public void task ( ) {
        if (io in (io_switch) ==ST _ON)
    SwitchOUT, set (ST _ON);
    else
        SwitchOUT, set (ST_OFF);
}
//task method. This is executed when method returns
true.
        //io._in reads out the value for the status of
the IO object.
        //the value is written by set method of the
network variable reference.
        TaskSwitch (String myname, LonTaskManager node,
NetVarRefInt nv_sw, IORef io _sw){
    super (myname, node);
    SwitchOut = nv_sw;
    io_switch = io_sw;
}
//task object constructor. The nodes, the network
//variables and IO defined by parameters at the time of
instance generation are determined.
        //The operation of interrelating them with
the node (task manager) is carried out by
//the upper class (LonTask) constructor. (at super
(myname, node))
}
/*task 2
    The data of the IO object (on the status of each
of the switches, ST_ON or ST_OFF) is read from it and
the exclusive OR of it and the status of the network
variable object is determined. The IO object and the
network variable objects to be processed are forwarded
in the form of parameters at the time of task
generation (instance generation).
*/
Class TaskExor extends LonTask {
    private NetVarRefInt SwitchIn;
    private NetVarRefInt SwitchOut;
    private IORef io_switch;
    public boolean when ( ) {
return (io_changes (io_switch));
}
//nv_update _occur returns true when the values of the
network variable objects are updated.
//public void task ( ) {
    if (IO_in (io_switch) ^ SwitchIn, state( )) == ST _ON)
    SwitchOut, set (ST_ON);
    else
```

-continued

```
    Switch OUT, set (ST_OFF);
}
//The state method of the network variable reference
object//returns the values of the network variables.
TaskExor (String myname, LonTaskManager node,
NetVarRefInt nv_sw _in, NetVarRefInt nv_sw _out, IORef
io_sw) |
    super (myname, node);
    SwitchIn = nv_sw _in;
    SwitchOut = nv _sw _out;
    io_switch = io_sw;
    }
}
/*task 3
    The status of the network variable objects is
output to the IO object.
*/
Class TaskLamp extends LonTask {
    private NetVarRefInt SwitchIn;
    private IORef LampOut;
    public boolean when ( ) {
        return (nv _updata _occur (SwitchIn));
}
public void task ( ) {
    io_out (LampOut, SwitchIn, state ( ));
}
    //io_out writes the value in the IO object.
TaskLamp (String myname, LonTaskManager node,
netVarRefInt nv _sw, IORef io _lamp) {
    super (myname, node);
    SwitchIn = nv _sw;
    LampOut = io _lamp;
}.
```

Additional advantage and modifications will readily occurtothose skilled in the art. Therfore, the invention in its broader aspects is not limmited to the specific details and representative embodiments showm and described herein. Accordingly, various modifications may be made without departing from the spirit of scope of the general inventive concept as defined by the appended claims and their equivalents.

What is claimed is:

1. A distributed control network system, comprising:
   a control client connected to a first communication network by means of a first communication protocol;
   a plurality of event-driven type distributed control microcomputers connected to a second communication network by means of a second communication protocol for executing programs written in a language different from the program language used by said control client; and
   a local control server connected to said first communication network by means of said first communication protocol, for controlling said distributed control microcomputers by means of said second communication protocol via said second communication network, said event-driven type executing programs written in the language same as the one used by said control client, transforming the processing program downloaded from said control client into a program written in the program language used by said distributed control microcomputers if said downloaded processing program being a program to be processed by said distributed control microcomputers and transmitting the transformed processing program to said distributed control microcomputers.

2. A distributed control network system according to claim 1, further comprising a third communication network connected to said first communication network and having a control server and a plurality of distributed control microcomputers connected thereto by way of a communication protocol different from said communication protocols for said first and second communication networks and the control server of said second communication network has means for transforming the communication protocol of said second communication network into the communication protocol of said third communication network and vice versa in order to make the distributed control microcomputers connected to said second communication protocol and the distributed control microcomputers connected to said third communication protocol capable of communicating with each other.

3. A distributed control network system according to claim 1, wherein said first communication network is a global network defined by the communication protocol of TCP/IP and said second communication network is a local network.

4. A distributed control network system, comprising:
   a plurality of control nodes comprising so many event-driven type distributed control microcomputers connected to a second communication network by means of a second communication protocol for executing tasks assigned respectively to them and written in a language different from the program language used by said control client; and
   a control server for enforcing a set of relationships among said plurality of distributed control microcomputers defined in a language same as the language used by said control client for the correspondence between a troubled one of said distributed control microcomputers and the one designed to replace the troubled microcomputer and execute its task and, upon the occurrence of a trouble in one of said plurality of distributed control microcomputers, causing the task assigned to the troubled microcomputer to be executed without interruption by a replacing distributed control microcomputer by automatically selecting said replacing microcomputer.

5. A distributed control network system according to claim 4, wherein said control client is shielded from the occurrence of a trouble in said distributed control microcomputers.

6. A program developing apparatus for a distributed control network system having a plurality of control nodes and a control server for controlling the control nodes, comprising:
   a parts window for displaying a group of icons representing objects of control on a graphic display screen;
   a program editing window;
   means for moving the icons displayed on said parts window into said program editing window by means of drag and drop operation to visually and positionally combine said objects of control with respective nodes and defining the flow of processing operations by connecting said plurality of nodes by means of lines; and
   means for generating source programs for the distributed control network system according to the positions of the objects of control combined with the respective nodes and the flow of processing operations defined by the preceding means.

7. A local control server connected between a first network and a second network, comprising:
   a first interface connected to the first network and configured to receive a first control program written in a first computer language;

a converter configured to convert the first control program into a second control program in a second computer language to be executed by a distributed controller; and a second interface connected to the second network and configured to output the second control program to the distributed controller through the second network.

8. A local control server connected between a first network and a second network, comprising:

receiving means connected to the first network for receiving a first control program written with a first computer language;

converting means for converting the first control program into a second control program with a second computer language to be executed by distributed controllers;

sending means connected to the second network for outputting the second control program to the second network; and means for dividing the first control program received by the receiving means into predetermined processing units of the first control program, causing the converting means to convert the divided processing units of the first control program into processing units of the second control program with the second computer language, and causing the sending means to send the divided processing units of the second control program to the distributed controllers, respectively through the second network.

* * * * *